June 6, 1961 F. VON GUNTEN 2,986,869
CALENDAR TIMEPIECE
Filed June 14, 1960
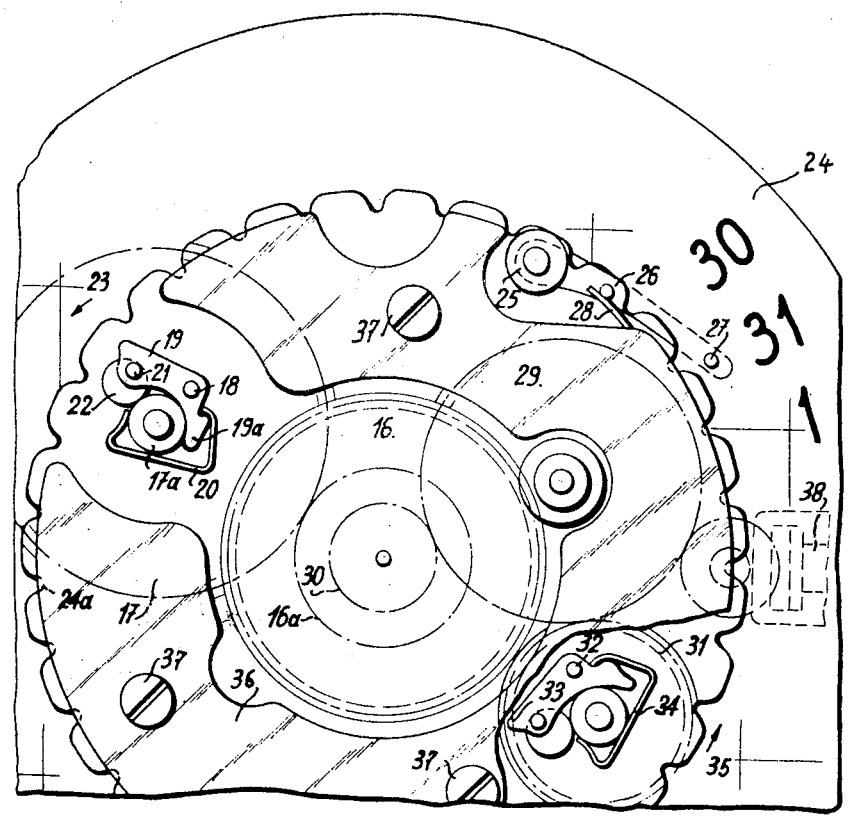
INVENTOR
FRITZ VON GUNTEN
BY John B. Lammlein
ATTORNEY

United States Patent Office 2,986,869
Patented June 6, 1961

2,986,869
CALENDAR TIMEPIECE
Fritz von Gunten, Soleure, Switzerland, assignor to Ed. Kummer A.G., Bettlach, Switzerland, a firm
Filed June 14, 1960, Ser. No. 35,963
Claims priority, application Switzerland Aug. 21, 1959
3 Claims. (Cl. 58—58)

The present invention relates to a calendar timepiece comprising a device for the date-setting of the day-of-the-month indicator controlled by the time-setting device of the timepiece.

The said timepiece is characterised by the fact that the said date-setting device comprises a wheel in direct engagement with the minute wheel and supporting a movable dog acting, in one direction of rotation of the wheel, on the said day-of-the-month indicator in such manner as to drive it, while in the opposite direction, corresponding to the normal direction of operation of the movement, the said dog yields resiliently so as not to drive the said indicator.

The accompanying drawing illustrates by way of example one constructional form of the subject of the invention.

The figure is a fragmentary diagrammatic plan view of a timepiece movement, partly broken away.

The illustrated timepiece comprises an hour wheel 16 fast with additional gear teeth 16a situated below it. The said additional gear teeth drive in a ratio of 1:2 a day-of-the-month wheel 17, which thus performs one revolution in 24 hours. The said day-of-the-month wheel has pivotally mounted thereon at 18 a pawl 19 subject to the action of a return spring 20 bearing on the one hand on a projection 19a on the pawl and on the other hand on the hub 17a of the wheel 17. The said pawl 19 supports a pin 21 extending through a hole in the wheel 17 so as to limit its movements.

During normal operation of the watch, the day-of-the-month wheel 17 turns in the direction of the arrow 23 and the end of the pawl 19 engages once per revolution, i.e. once every 24 hours, in the internal teeth 24a of a day-of-the-month annulus 24, so as to drive the latter by one tooth. During the rotation of the wheel 17 in the opposite direction, for example during the time-setting, the pawl 19 jumps over the teeth 24a without driving the annulus 24. A jumper consisting of a roller 25 mounted on a rocking lever 26 pivotally mounted at 27 on the movement co-operates with the internal teeth 24a under the action of the return spring 28.

The minute wheel 29 connecting the hour wheel cannon pinion (diagrammatically shown at 30) is in direct engagement with a wheel 31 of a day-of-the-month corrector. The said wheel 31 has pivotally mounted thereon at 32 a pawl 33 similar to the pawl 19 of the wheel 17 and subject to the action of a return spring 34. When the wheel 31 turns in the direction of the arrow 35 during the manual hour-setting, the pawl 33 drives the annulus 24 indicating the days of the month. On the other hand, when the wheel 31 turns in the opposite direction during normal operation of the watch, the pawl 33 yields against the action of the return spring 34 and jumps over the teeth of the gearing 24a without driving it.

The reduction ratio between the minute wheel 29 and the wheel 31 is such that the wheel 31 turns much more quickly than the wheel 17, whereby the date-setting of the day-of-the-month indicator is facilitated. However, this date-setting will preferably take place by a reciprocating movement of the stem 38 of the winder, which produces a displacement of the hands corresponding to approximately 15 minutes, which permits a more rapid correction.

A bridge 36 fixed by screws 37 maintains the annulus 24 in position.

As a modification, the rigid pawl 33 could be replaced by a resilient pawl fixed, by one of its ends, to the wheel 31 and the free end of which engages resiliently the gearing 24a.

What I claim is:

1. Calendar timepiece comprising a minute wheel, a time-setting device, an indicator of the day-of-the-month, and a date-setting device of the said indicator, in which the said date-setting device comprises a wheel in direct engagement with the said minute wheel, and a pawl mounted on the said wheel in engagement with the minute wheel and acting, in one direction of rotation of the said wheel, on the said indicator so as to drive it, while in the opposite direction, corresponding to the normal direction of operation of the movement, the said pawl yields resiliently so as not to drive the said indicator.

2. In a calendar timepiece as claimed in claim 1, comprising a wheel operating the said indicator during normal operation of movement, the feature that the reduction ratio between the said minute wheel and the said wheel in engagement therewith is such that the latter rotates a number of times more quickly than the said wheel normally operating the said indicator.

3. Calendar timepiece comprising a minute wheel, a time-setting device, an indicator of the day-of-the-month, and a date-setting device of the said indicator, in which the said date-setting device comprises a wheel in direct engagement with the said minute wheel, a rigid pawl pivotally mounted on the said wheel in engagement with the minute wheel, and a return spring acting on the said pawl, this latter acting, in one direction of rotation of the said wheel, on the said indicator so as to drive it, while in the opposite direction, corresponding to the normal direction of operation of the movement, the said pawl yields resiliently so as not to drive the said indicator.

References Cited in the file of this patent
FOREIGN PATENTS

| 226,719 | Switzerland | Nov. 16, 1944 |
| 328,143 | Switzerland | Apr. 15, 1958 |
| 337,133 | Switzerland | Apr. 30, 1959 |